United States Patent [19]

Hardage

[11] Patent Number: 5,144,589
[45] Date of Patent: Sep. 1, 1992

[54] METHOD FOR PREDICTING FORMATION PORE-PRESSURE WHILE DRILLING

[75] Inventor: Bob A. Hardage, Sugarland, Tex.

[73] Assignee: Western Atlas International, Inc., Houston, Tex.

[21] Appl. No.: 643,352

[22] Filed: Jan. 22, 1991

[51] Int. Cl.⁵ .............................................. G01V 1/00
[52] U.S. Cl. ........................................ 367/25; 367/38; 175/50; 181/102; 73/152
[58] Field of Search ............... 367/25, 37, 38; 175/50; 73/151, 152; 181/102

[56] References Cited

U.S. PATENT DOCUMENTS

| | | | |
|---|---|---|---|
| 4,040,003 | 8/1977 | Beynet et al. | 340/18 LD |
| 4,066,995 | 1/1978 | Matthews | 340/18 LD |
| 4,254,481 | 3/1981 | Smither et al. | 367/82 |
| 4,286,461 | 9/1981 | Bres et al. | 73/155 |
| 4,817,062 | 3/1989 | De Buyl et al. | 367/73 |
| 4,922,362 | 5/1990 | Miller et al. | 367/46 |
| 4,959,818 | 9/1990 | Cole | 367/189 |

FOREIGN PATENT DOCUMENTS

2556043  12/1963  France .
1493776   7/1989  U.S.S.R. .

OTHER PUBLICATIONS

Treherne, D. M., et al., Sep. 27-30, 1987, "Acoustic Directional Surveying Instrument", Society of Petroleum Engineers SPE 16678.
Byrd, William C., Oct. 1978, "Special tools, applications improve drilling rates", World Oil, pp. 71-75.
Rector, James W. and Marion, Bruce P., Mar. 1989, "Use of Drill-Bit Energy as Downhole-Seismic Source", AAPG Bulletin, vol. 73, No. 3, p. 403.
Rector, James W., III and Marion, Bruce P., Apr. 1989, "Extending VSP to Three-Dimensional MWD: Using Drill Bit as Downhole Seismic Source," AAPG Bulletin, vol. 73, No. 4, p. 549.
Adams, Neal J., Drilling Engineering, A Complete Well Planning Approach, Chapter 3 "Predicting Formation Pressures," PennWell Books, Tulsa, pp. 38-96.
Kendall, H. A., "Friction Pressures, Fracture Gradients, Critical Offshore Well Control Factors", 20 pp.
Keith, Colum M. and Crampin, Stuart, "Seismic body waves in anisotropic media: synthetic seismograms", Geophys. J. R. astr. Soc. (1977)49, 225-243.
Keith, Colum M. and Crampin, Stuart, "Seismic body waves in anisotropic media: reflection and refraction at a plane interface", Geophys. J. R. astr. Soc. (1977) 49, 181-208.
Crampin, Stuart, "A review of the effects of anisotropic layering on the propagation of seismic waves", Geophys. J. R. astr. Soc. (1977) 49, 9-27.

*Primary Examiner*—J. W. Eldred
*Attorney, Agent, or Firm*—E. Eugene Thigpen

[57] ABSTRACT

A method for predicting the formation pore-pressure ahead of the drill bit while drilling is disclosed. During the drilling process, the drill bit impacting the earth generates a seismic signal. The seismic signal propagate away from the drill bit in a radial fashion with some rays paths propagating directly towards the surface, while others propagating downward are reflected back towards the surface. The direct and reflected seismic signals are received by seismic sensors at one or more locations. The signals produced by the sensors are recorded for later processing. From the recorded signals an interval velocity for each formation behind the drill bit is determined much in the same way a vertical seismic profile is made. From the reflected seismic signals, an acoustic impedance for each formation ahead of the drill bit is determined. The results of the interval velocity determination and the acoustic impedance information are combined to produce a log-like impedance estimation curve which reflects the pore-pressure present in the subsurface units ahead of the drill bit. This information is helpful to the drilling engineer who can predict the appropriate weight of the drilling mud and thus prevent possible blow-outs and pressure kicks.

2 Claims, 6 Drawing Sheets

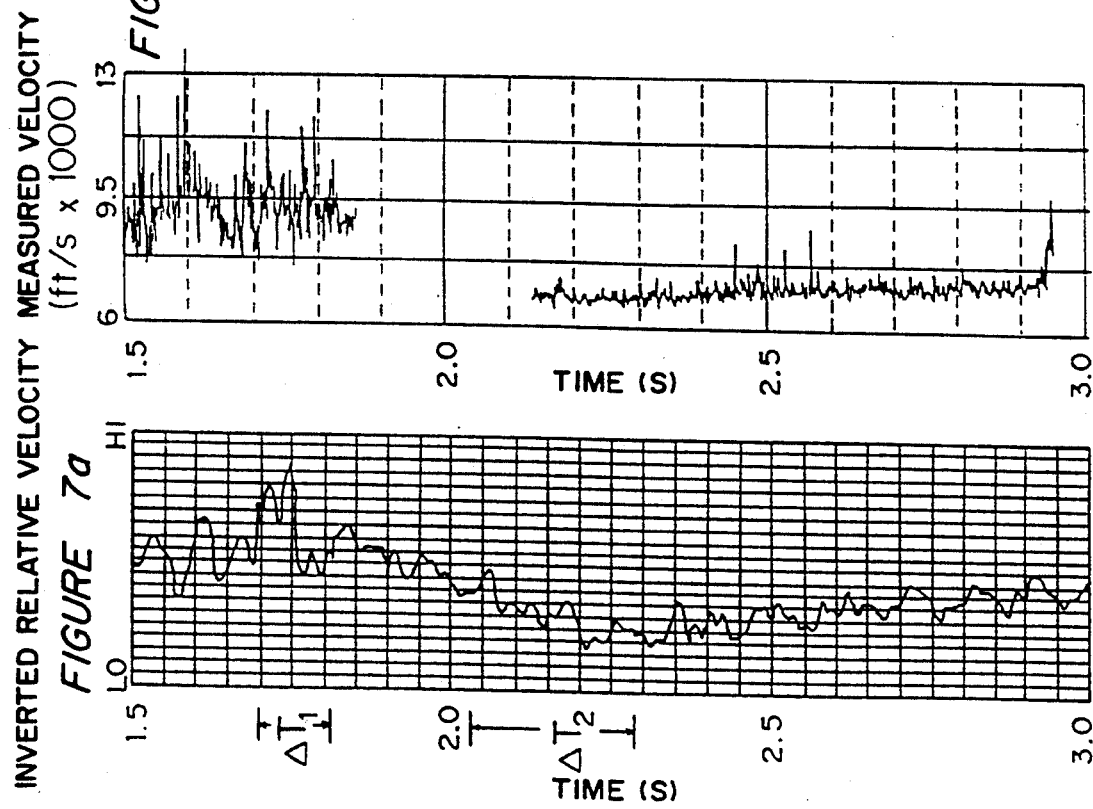

METHOD FOR PREDICTING FORMATION PORE-PRESSURE WHILE DRILLING

BACKGROUND OF THE INVENTION

1. Field of the Invention

This invention relates generally to methods for obtaining subsurface geological information in the exploration of petroleum deposits. More particularly, the invention relates to a method for forecasting formation pore-pressure while drilling.

2. Discussion of the Related Art

Well planning is perhaps the most demanding aspect of drilling engineering. It requires the integration of engineering principles, corporate or personal philosophies, and experience factors. Although well planning methods and practices may vary within the drilling industry, the end result should be a safely drilled, minimum-cost bore hole that satisfies the reservoir engineer's requirements for oil and gas production.

The formation, or pore pressure encountered by the well significantly affects the well plan. If pressure is not properly evaluated, it can lead to drilling problems such as lost circulation, blowouts, stuck pipe, hole instability, and excessive costs. Unfortunately, formation pressures can be very difficult to quantify precisely where unusual, or abnormal, pressures exist.

Formation pore pressure is defined as the pressure exerted by the formation fluids on the walls of the rock pores. The fluids are typically gas, oil, or salt water. The pore pressure supports part of the weight of the overburden (weight of the overlying rock matrix and pore fluid), while the other part is supported by the grains of the rock. The terms pore pressure, formation pressure and fluid pressure are synonymous, referring to formation pore pressure.

Formations are classified according to the magnitude of their pore pressure gradients. In general, two types of formation pressure are recognized. A formation is said to be normally pressured when its pore pressure is equal to the hydrostatic pressure of a full column of formation water. Normal pore pressure is usually on the order of 0.465 pounds per square inch per foot (psi/ft; 0.105 bar per meter, (bar/m)). Abnormal formation pressure exists in zones which are not in direct communication with adjacent strata. The boundaries of the abnormally pressured zone are impermeable, preventing fluid communication and making the trapped fluid support a larger proportion of the overburden stress. Abnormal formation pressures may be as high as 1 psi/ft for tectonically relaxed areas and 0.8 psi/ft for tectonically active areas. Details on the origins and causation of formation pore pressure are beyond the scope of this section and will not be discussed further.

In the past, abnormal formation pressure has been estimated using surface seismic reflection surveys. Such surveys have been used to establish the top of abnormally pressured formations and to evaluate the magnitude of the pressures. Typically, an acoustic source located along the surface is actuated to produce energy in the subsurface in the form of compressional waves. The time required for the energy to travel to a reflector and back to a sensor is measured. The average velocity is computed from the following expression:

$$V = X^2/t^2 \quad V = X/t$$

where V is the average velocity, X is the distance traveled by the signal, and t is the time to travel the distance.

The depth of the reflector may be determined by taking the product of the average velocity and one-half the travel time. The interval velocity from seismic profiles is the reciprocal of interval travel time. The reciprocated values can be plotted versus depth to indicate the presence of abnormal pressures. A normal environment exhibits decreasing porosity as compaction occurs. Therefore, the travel times should decrease. An abnormal pressure zone has greater-than-normal porosities for the specific depth and causes higher travel times.

Log analysis is a common procedure for pore pressure estimation in both offset wells and the actual well drilling. New measurement-while-drilling (MWD) tools implement log analysis techniques in a real-time drilling mode. The analysis techniques use the effect of the abnormally high porosities on rock properties such as electrical conductivity, sonic travel time, and bulk density.

The resistivity log was originally used in pressure detection. The log's response is based on the electrical resistivity of the total sample, which includes the rock matrix and the fluid-filled porosity. If a zone is penetrated that has abnormally high porosities (and associated high pressures), the resistivity of the rock will be reduced due to the greater conductivity of water than rock matrix. Upon penetrating an abnormal pressure zone, a deviation or divergence will be noted. The degree of divergence is used to estimate the magnitude of the formation pressures.

Hottman and Johnson developed a technique based on empirical relationships whereby an estimate of formation pressures could be made by noting the ratio between the observed and normal rock resistivities. Subsequent to the Hottman and Johnson approach, unpublished techniques were developed that used overlay or underlay for a quick evaluation of formation pressures. The overlay (underlay) contains a series of lines that represent formation pressure expressed as mud weight. The overlay (underlay) is shifted left and right until the normal pressure line is aligned with the normal trend. Formation pressures are read directly from a visual inspection of the location of the resistivity plots within the framework of the lines.

The Hottman and Johnson procedure, as well as the overlay techniques, assume that formation resistivities are a function of lithology, fluid content, salinity, temperature, and porosity. The procedures make the following assumptions with respect to these variables: lithology is shale, shale is water filled, water salinity is constant, temperature gradients are constant, and porosity is the only variable affecting the pore pressure. Formations with varying water salinities can prevent the reliable use of the Hottman and Johnson technique.

The sonic log has been used successfully as a pressure evaluation tool. The technique utilizes the difference in travel time between high-porosity overpressure zones and low-porosity, normal pressure zones. Hottman and Johnson studied several wells and developed a pressure relationship. The manner in which formation pressures are calculated using the Hottman and Johnson approach is similar to their method for resistivity plots. Observed transit times are plotted, and the normal trend line is established and extrapolated throughout the pressure region. At the depth of interest, the difference between the observed and normal travel times is established. This difference is used to estimate the formation pressure by correlating with equivalent mud weight in pounds per gallon.

Although each of the above logging techniques is relatively effective in determining the formation pressure, each is post determinative. That is to say that the well must be drilled before the calculation is made. Thus the risk of a blowout or major kick has already occurred and much of the safety concerns have passed.

SUMMARY OF THE INVENTION

The instant invention is a method for predicting the fluid or pore pressure of a formation while drilling. The impact of the drill bit with the earth produces a seismic signal which propagates through the earth as an expanding wavefront. Portions of the signal propagate directly through the earth to sensors at a predetermined location. The direct signals are depth sampled to produce an interval velocity curve. From such data, the interval velocity can be determined. Other portions of the seismic signal are reflected from horizons or structures ahead of the drill bit. In a conventional manner, the reflected seismic signals are used to estimate the acoustic impedance of the formations. The acoustic impedance data may be inverted and combined with the interval velocity data to produce a real-drill-time, log-like impedance estimation curve. From such a curve, the formation pressure may be predicted and updated continuously to provide the driller the most recent information to decide whether to "weight up" the drilling fluid or stop drilling altogether. This method may be applied in all drilling situations.

BRIEF DESCRIPTION OF THE DRAWING FIGURES

A better understanding of the benefits and advantages of my invention may be obtained from the appended detailed description and drawing figures, wherein.

Figure 6:
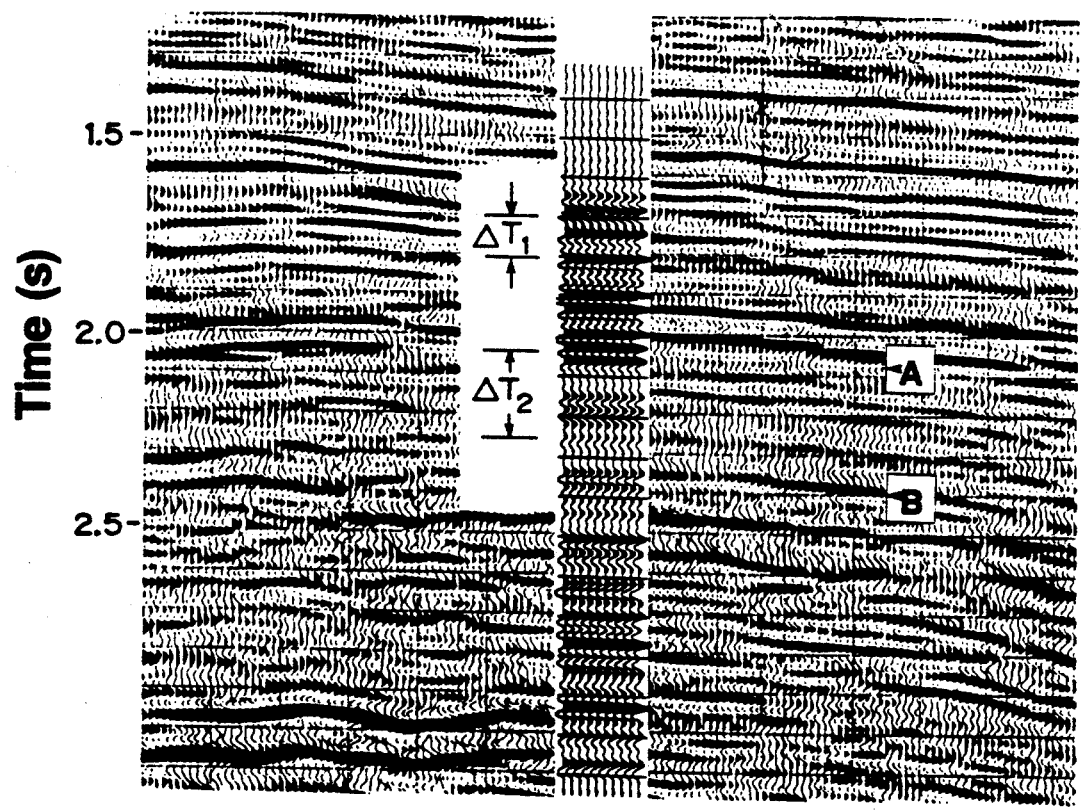
FIG. 6 is a comparison between a seismic line crossing the well in FIG. 5, and a corridor stack of the primary reflection events obtained from the wavefield recorded at the same well.

FIGS. 7a and 7b are enlarged views of the data windows shown in FIGS. 6 and 7a and 7b demonstrating the correlation between the peaks/troughs of the seismic reflections and the corresponding increases/decreases in the inversion curve.

DETAILED DESCRIPTION OF ONE EMBODIMENT OF THE INVENTION

Figure 1:
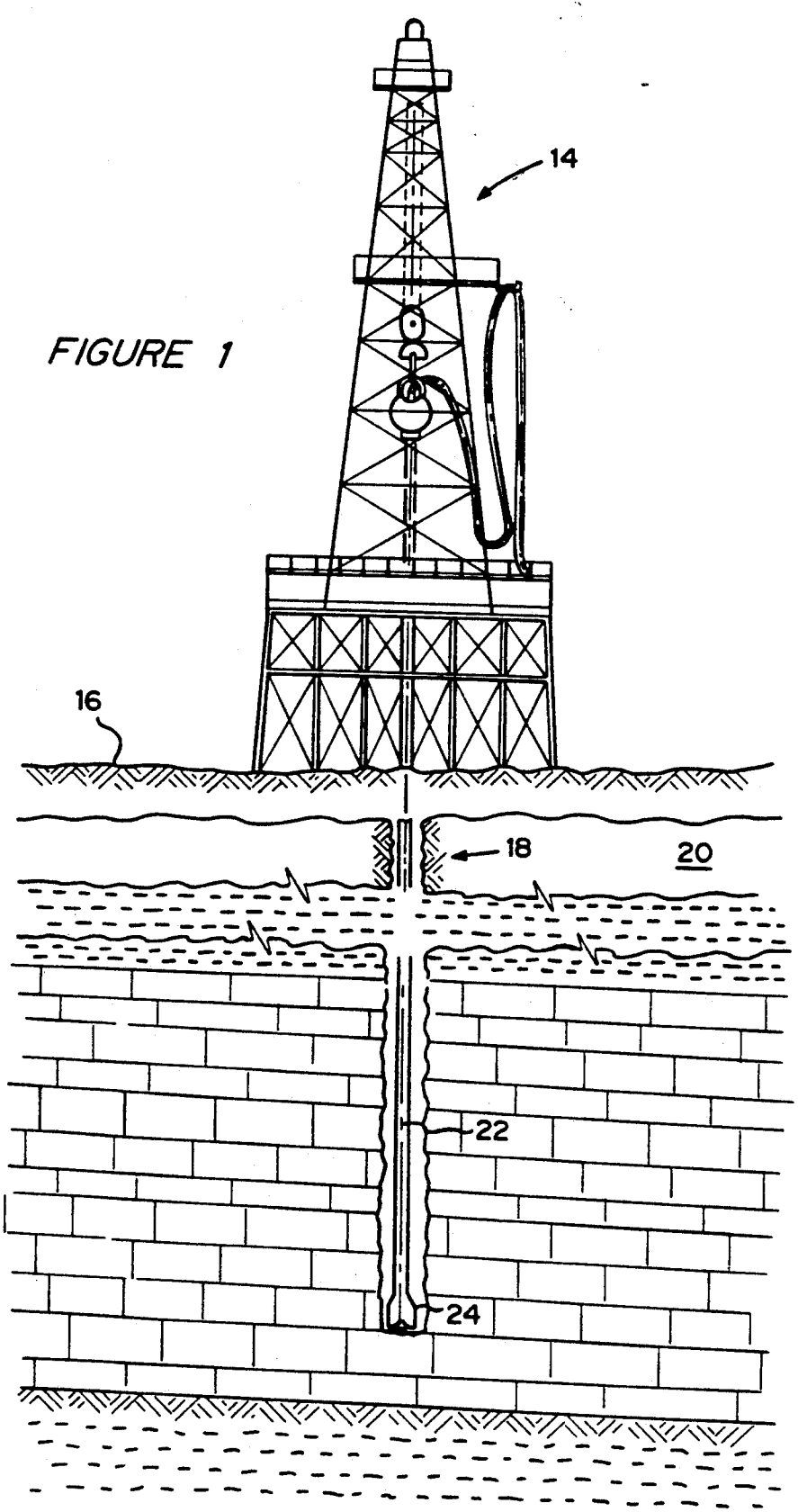
FIG. 1 is a general illustration of a bore hole being drilled in the earth.

FIG. 1 is a general illustration of a bore hole being drilled in the earth. A drill rig, generally indicated by reference 14, has been located on the surface of the earth 16 to drill a well 18 in the subsurface, generally indicated by reference 20. The drill rig 14 supports a drill string 22 having a drill bit 24 at a lower end used to bore through the subsurface units 20. A turn table 26 in the drill rig floor rotates the drill string causing the drill bit to cut into the subsurface. Cuttings from the bore hole may be removed in a conventional manner using a fluid forced down through the drill string and exiting at the drill bit. The fluid then flows up the bore hole carrying the cuttings to the surface where they are disposed of.

Figure 2:
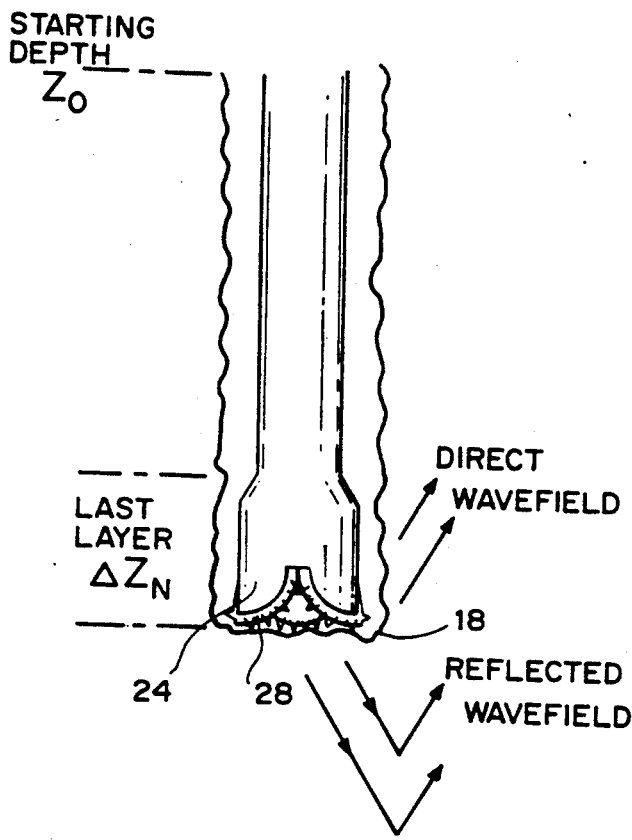
FIG. 2 illustrates the wavefields produced as a bit drills through a stratigraphic unit.

FIG. 2 illustrates the wavefields produced as a bit drills through a stratigraphic unit. Illustrated is a drill bit 24 at the bottom of the well bore 18 and the seismic wavefields generated by the drill bit in a formation. The drill bit illustrated is a tricone bit well known in the industry. Each cone 28 rotates and has a plurality of projections or teeth which chip away a portion of the formation as the drill bit is turned. As each tooth contacts the earth a seismic signal is generated. The seismic signal typically consists of a compressional wave and a shear wave. The wavefields propagate through the formation as an expanding wave-front. A portion of each wavefield propagates directly to the surface where it is detected by sensors. Another portion of each wavefield propagates downward and is reflected towards the surface by the subsurface formations.

The basic concepts of the inventive method are based on the direct and reflected drill-bit wavefields depicted in FIG. 2. From the direct wavefield, one can obtain an interval velocity curve, finely sampled in the vertical dimension that establishes the velocity behavior in the low frequency range from 0 up to 8 or 10 Hertz (Hz) starting at the first data acquisition depth, located at $Z_O$, and extending down to the depth of the bit. Moreover, such data provides a continuously updated definition of the interval velocity in the earth layer, $\Delta Z_N$, immediately above the current bit depth. The reflected wavefield can be used to identify reflecting boundaries ahead of the drill bit, and provide a wideband estimate of the impedance layering ahead of the bit. It is contemplated that the wideband estimate of the impedance layering ahead of the bit would be in the range from 8 Hz to greater than 80 Hz. It is the wideband estimate or inversion that can be combined with the low frequency estimate to produce a real-drill-time, log-like impedance estimation curve. Methods of making the wideband estimate or inversion are well known in the industry.

Figure 3:
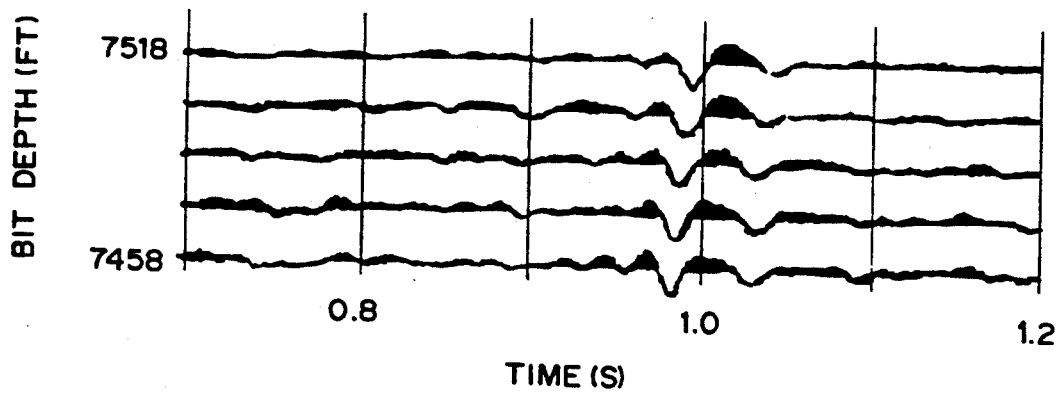
FIG. 3 illustrates the direct arrival of compressional waves recorded at closely spaced depth levels as a rotary cone bit penetrates a sand-shale section.
Figure 4:
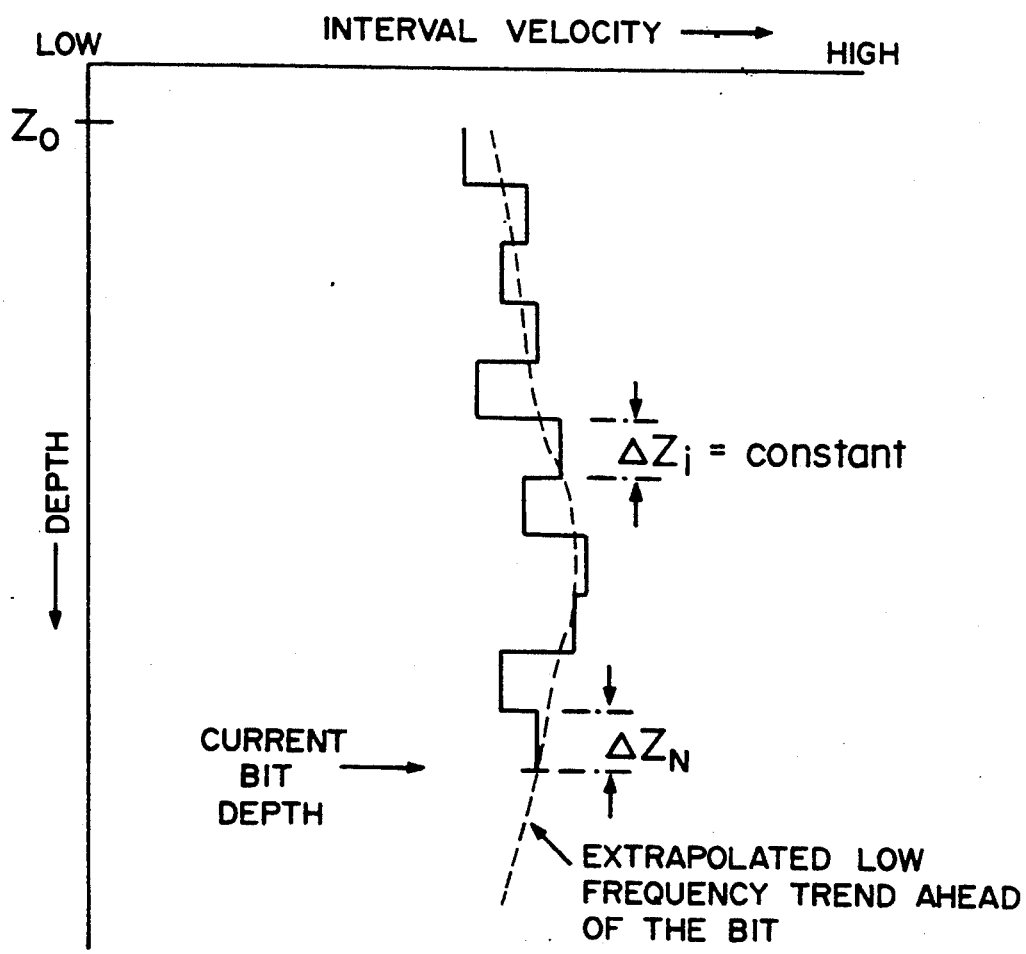
FIG. 4 is an idealized interval velocity curve that could be constructed from compressional wave direct arrivals generated by a drill bit.

Establishing the velocity behavior in the low frequency range from the first data acquisition depth down to the drill bit may be illustrated by referring to FIG. 3 and 4. The data in FIG. 3 are drill bit direct arrivals from a stratigraphic interval a few hundred feet above a geopressured section. In this instance, it was possible to produce a direct arrival with acceptable signal-to-noise properties by recording the signals generated as the bit progressed through only a few feet of a sand-shale sequence. In other instances, it may be necessary for the depth recording interval between successive direct arrivals to be expanded to 20 or 30 feet in order to produce good quality signals. It should always be possible to get direct arrivals that are depth sampled so that an interval velocity curve, such as shown in FIG. 4, can be produced in which the velocity layer thickness, $\Delta Z_i$, is only a few tens of feet. The notation in FIG. 4 is consistent with that used in FIG. 2, with $Z_O$ representing the depth where the data acquisition commenced, and $\Delta Z_N$ being the velocity layer immediately above the bit. A critical feature of such an interval velocity curve is that the low frequency velocity behavior can be determined between $Z_O$ and the current bit depth.

A low frequency approximation is indicated by the dashed curve in FIG. 4. It is assumed that the low frequency velocity trend immediately above the bit can be extrapolated to produce an adequate approximation of the low frequency velocity behavior for a short distance below the bit. By way of definition, "short distance" may be any distance between 100 to 500 feet, and in some instances could be farther. Using an efficient well site inversion algorithm, the following advantages of drill bit generated seismic data are realized. An example of a typical inversion algorithm is disclosed in *Vertical Seismic Profiling, Part A — Principals,* Second Edition, Pergamon Press, Oxford, England, 1985 by Bob A. Hardage, and incorporated herein by reference.

A short distance prediction presents no serious limitation because the prediction can be done as often as desired to keep a continuously moving safety window ahead of the bit in which geopressure trends can be detected. Additionally, the continuous updating of the interval velocity in the successively deepening layer, $\Delta Z_N$, immediately above the bit allows new low frequency estimations and extrapolations to be constructed as often as stratigraphic variations demand.

Figure 5:
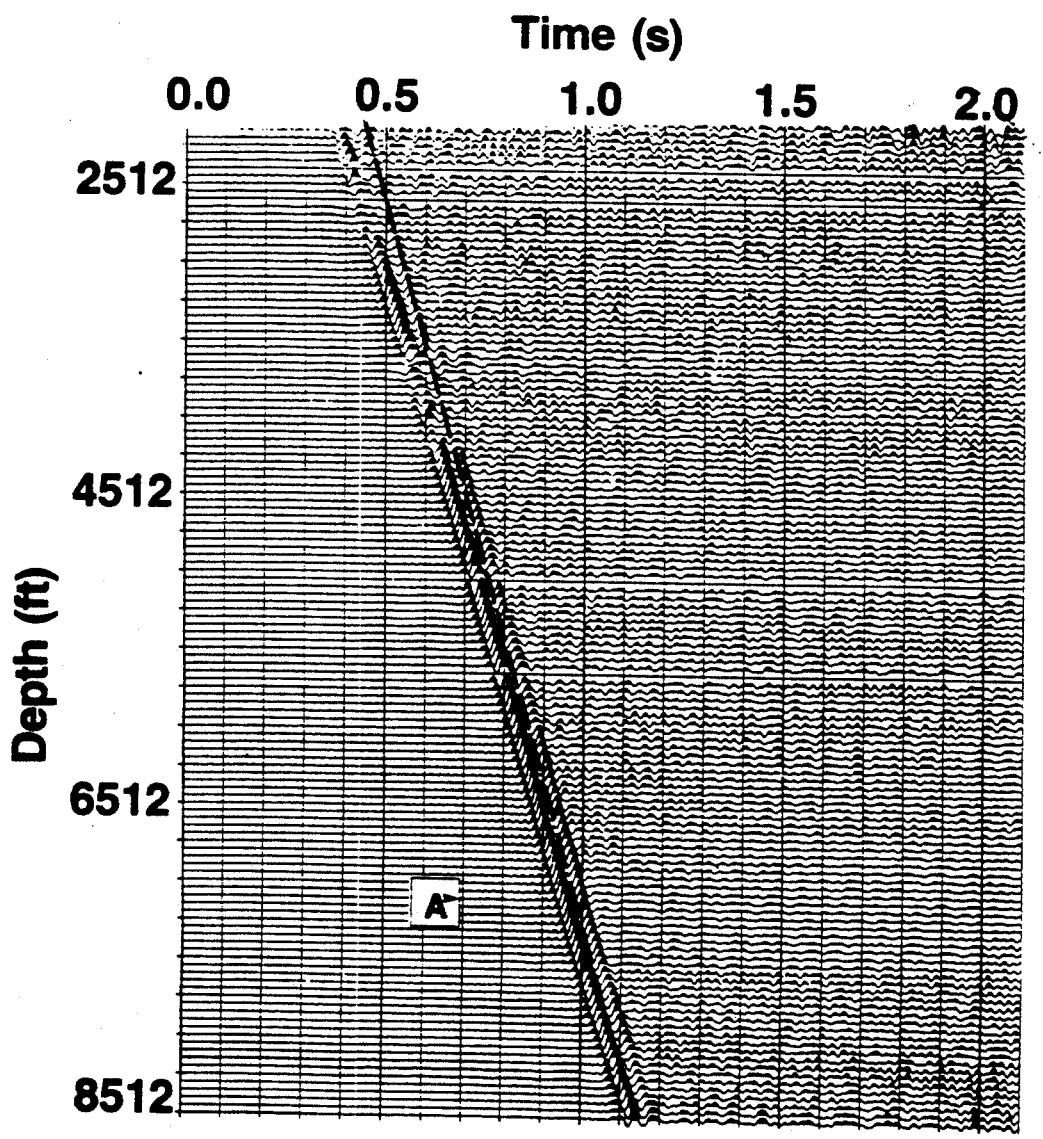
FIG. 5 is a example of a geopressured section recorded at an actual well site.

Identifying the reflecting boundaries ahead of the bit and to provide a wideband estimate of the impedance layering ahead of the drill bit requires analysis of the reflected drill bit wavefield. FIGS. 5, 6 and 7 illustrate one inversion test that has been done using the drill bit generated reflections.

The drill bit wavefield in FIG. 5 has been sampled at intervals of 50 feet for plotting purposes, but the data in FIG. 3 which were analyzed at intervals of 14 feet were also recorded at the same location, so a smaller spatial sampling could be used for analysis purposes if desired. The center panel in FIG. 6 is a corridor stack of the primary reflection events extracted from this wavefield, using only the traces above depth A. Two time windows, $\Delta T_1$ and $\Delta T_2$, will be used to indicate how these wideband reflection data can be used to predict impedance behavior.

Window $\Delta T_1$ spans a prominent impedance contrast in the normally pressured interval above A. Window $T_2$ is positioned in the geopressured interval below A. Both windows correspond to short distance predictions. An inversion of the reflection sequences defined by the center panel is shown as the left most curve in FIG. 7. This inversion was accomplished using a similar technique to that disclosed above in a data processing center, not at the well site, and the low frequency behavior was determined from the checkshot interval velocity curve measured through the entire drilled interval. Data windows $T_1$ and $T_2$ correspond to the same windows labeled in FIG. 6.

Expanded views of the drill bit reflection events and the inversion curve within these two windows are shown in FIG. 8. Note the correspondence between the peaks of the seismic trace and the respective increases in the inversion curve. Likewise, reflection troughs are generally time-aligned with decreases in the impedance profile. The fact that some peaks/troughs do not seem to produce the proper magnitudes of increase/decrease in the impedance curve is due, in part, to the low frequency trend imposed on the inversion, which has a strong effect on the final impedance values.

FIG. 8 is simply to demonstrate, that for short prediction distances, the relative amplitudes of reflection peaks and troughs may be directly converted, in a qualitative way, into corresponding relative increases and decreases in impedance layering.

My invention has been described with a certain degree of specificity. Variations will occur to those skilled in the art which are within the scope and spirit of this invention which is limited only by the appended claims, wherein:

I claim as my invention:

1. A method of generating an estimate of acoustic impedance as a function of depth in a formation in the region below a drill bit being utilized for drilling a well, comprising, utilizing seismic signals generated by the drill bit travelling directly from the drill bit to the surface to develop interval velocity data for the region of the formation through which the drill bit has drilled;

updating the interval velocity data as the well is drilled deeper;

estimating slowing varying changes in the formation acoustic impedance below the drill bit on the basis of low frequency changes in the interval velocity data for the formation in the region above the drill bit; and correcting acoustic impedance data for the formation ahead of the drill bit derived from reflection seismic data by applying said estimated slowly varying changes in acoustic impedance to said acoustic impedance data.

2. The method of claim 1 wherein said reflection seismic data are derived from the signal generated by said drill bit.

* * * * *